Oct. 14, 1941.    A. W. L'HOMMEDIEU ET AL    2,258,776
VARIABLE SPEED MECHANISM
Filed April 19, 1940    5 Sheets-Sheet 2
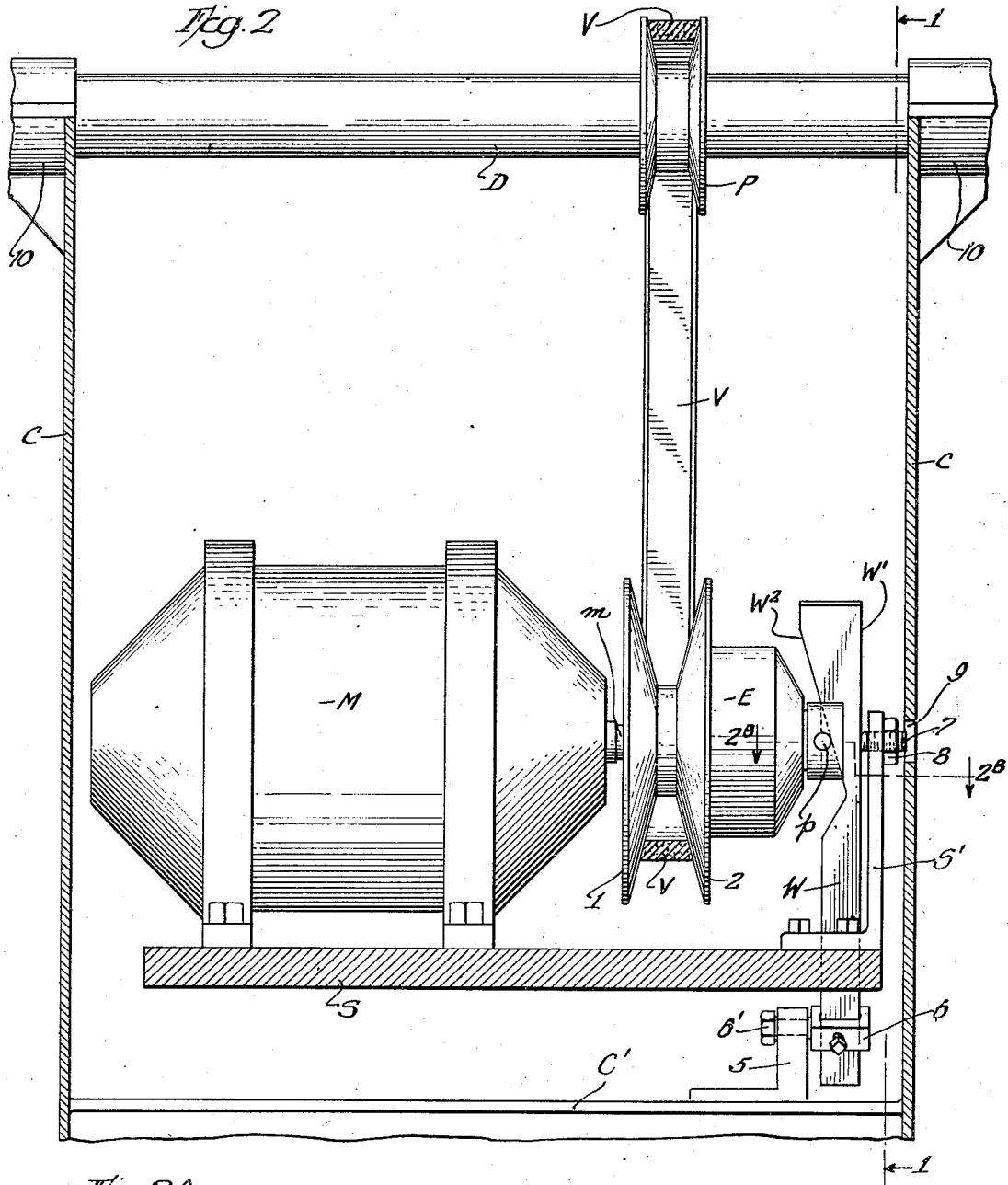
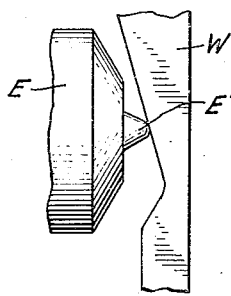
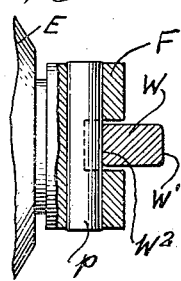
Inventors:
Arthur W. L'Hommedieu,
Eric Hawkinson,
By Chas P. Murray
Atty Oct. 14, 1941.   A. W. L'HOMMEDIEU ET AL   2,258,776
VARIABLE SPEED MECHANISM
Filed April 19, 1940   5 Sheets-Sheet 3

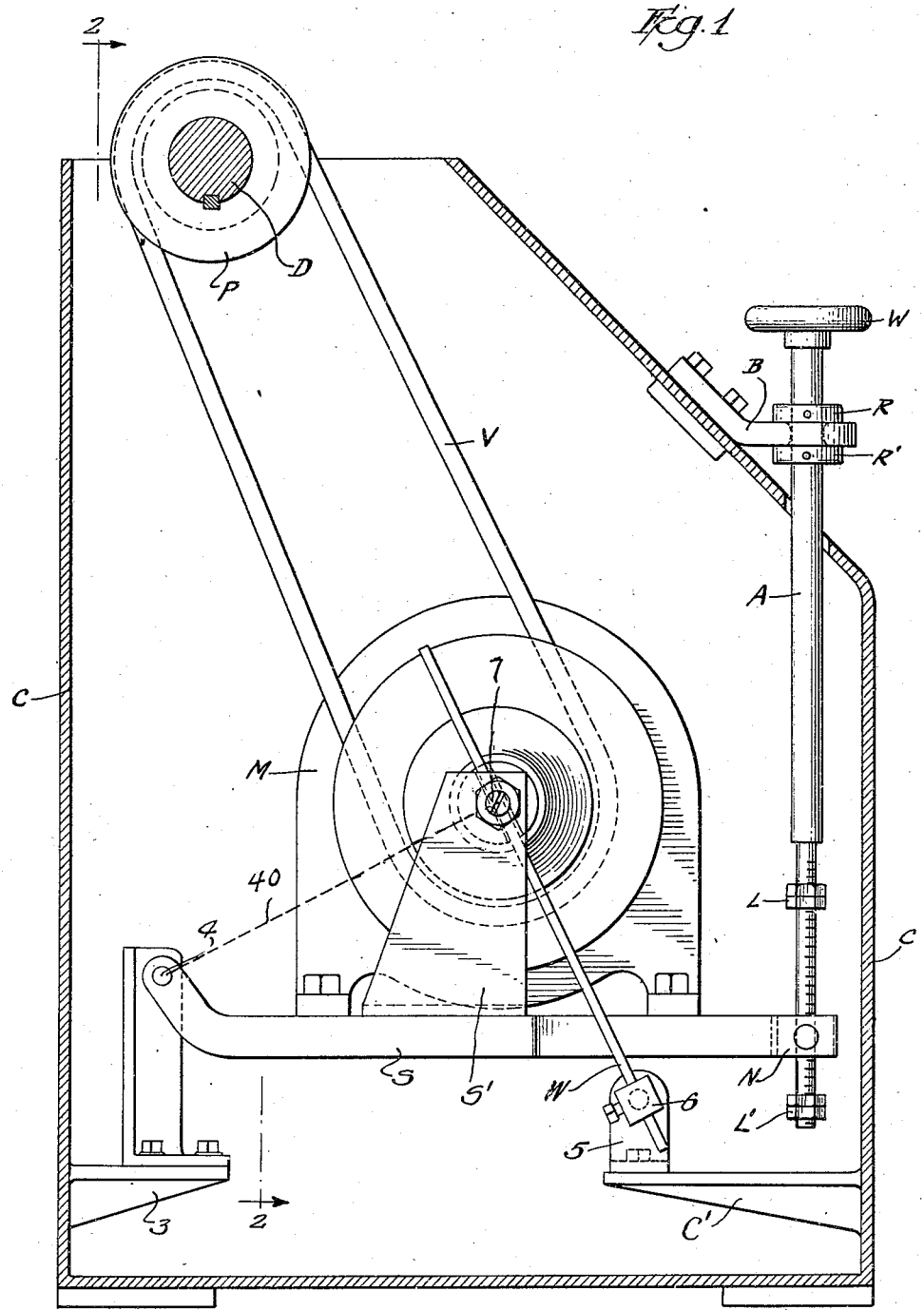

Inventors:
Arthur W. L'Hommedieu,
Eric Hawkinson,
By Chas. F. Murray
Atty.

Oct. 14, 1941.  A. W. L'HOMMEDIEU ET AL  2,258,776
VARIABLE SPEED MECHANISM
Filed April 19, 1940  5 Sheets-Sheet 4
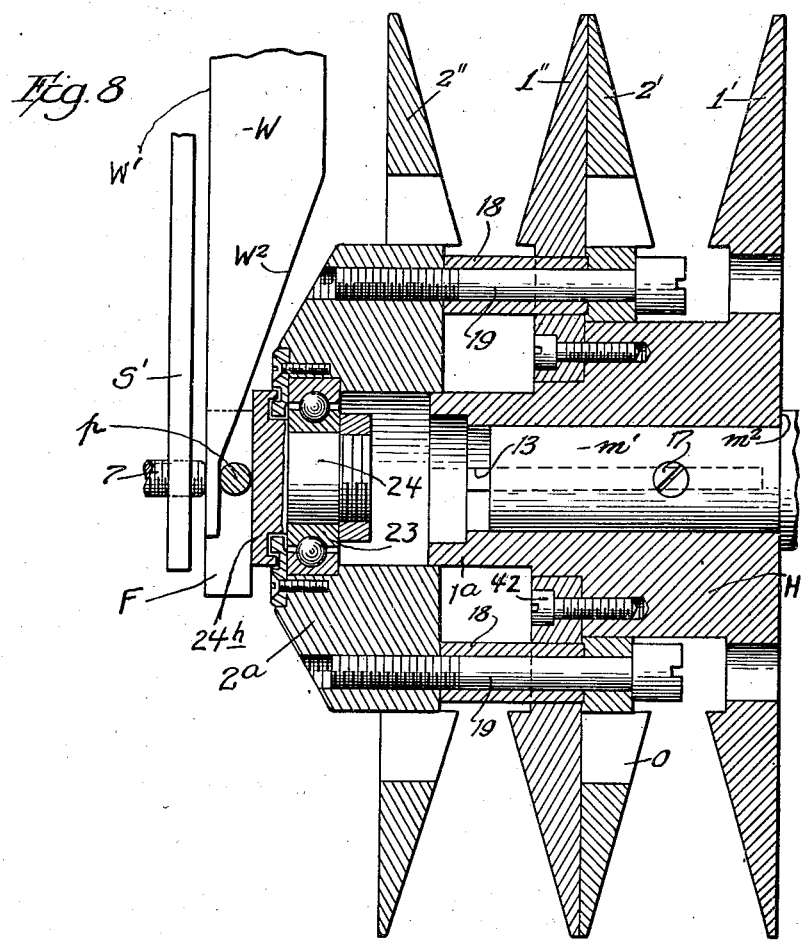
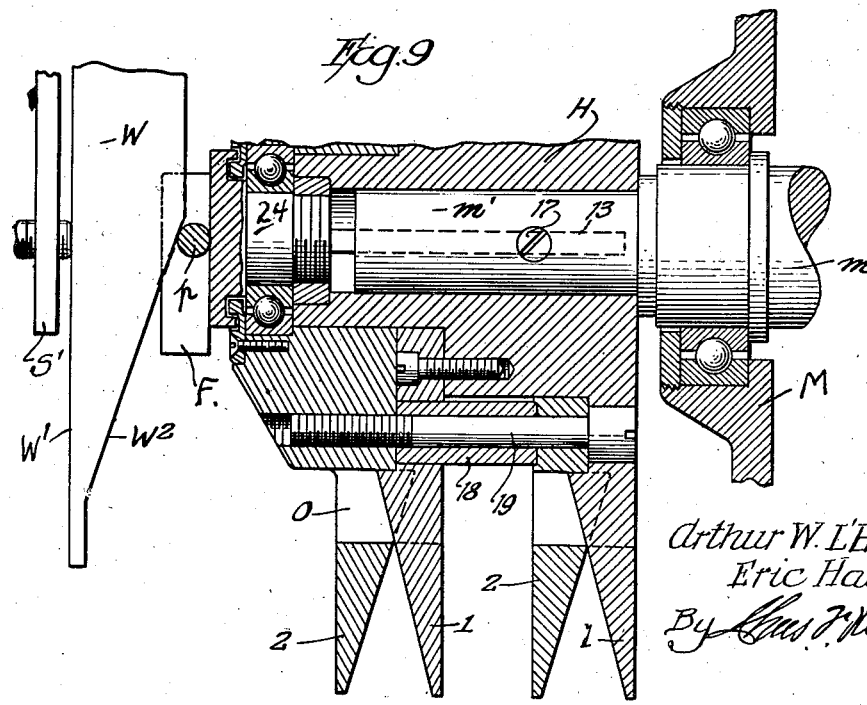
Inventors:
Arthur W. L'Hommedieu,
Eric Hawkinson,
By Chas. F. Murray
atty.

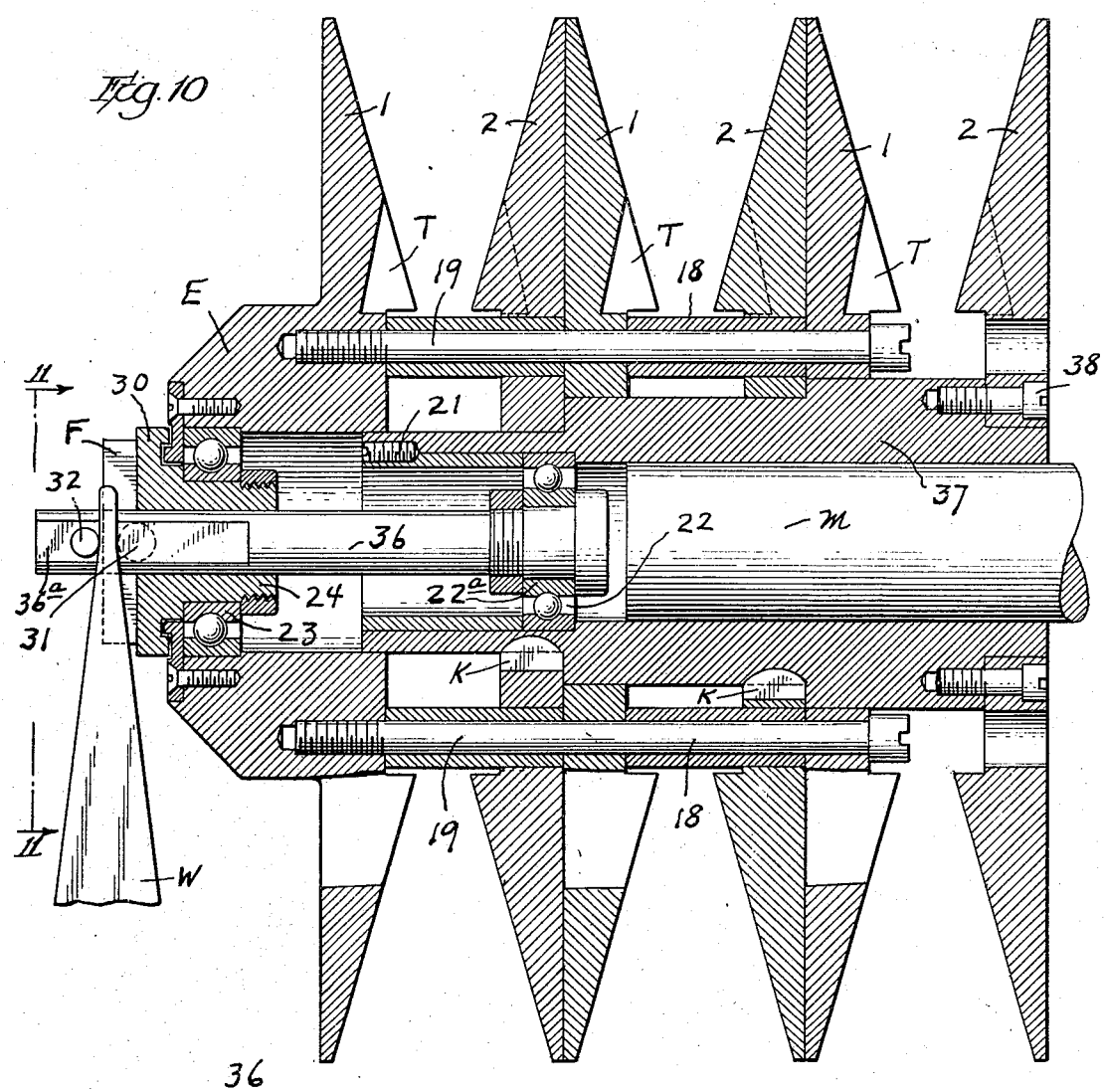
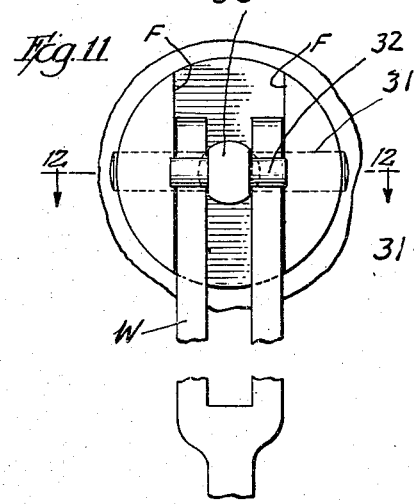
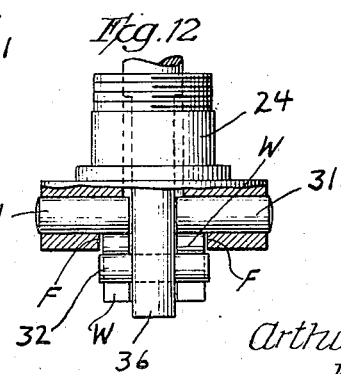

Patented Oct. 14, 1941

2,258,776

UNITED STATES PATENT OFFICE 2,258,776

VARIABLE SPEED MECHANISM

Arthur W. L'Hommedieu and Eric Hawkinson, Chicago, Ill., assignors to Chas. F. L'Hommedicu & Sons Co., Chicago, Ill., a corporation of Illinois Application April 19, 1940, Serial No. 330,568

11 Claims. (Cl. 74—230.17)

This application is a refiling and in part a more adequate continuation of our application No. 280,286, entitled Variable speed mechanism, and filed June 21, 1939.

Our invention relates to variable speed drives of the class in which a driving shaft is operatively connected to a parallel driven shaft by one or more endless V-belts, each of which belts extends over an expansible sheave on one shaft and a rigid pulley on the other shaft, and in which the speed ratio of the transmission can be varied (while the drive is in operation) by correlated variation in the spacing between the axes of the two shafts and in the effective width of each expansible sheave.

In its general objects our invention aims to provide a compact and durable speed-changing drive of this class, of modest cost in comparison with heretofore employed types, including unusually simple means whereby even an inexperienced workman by a single manipulation can readily effect the said correlated variations in the shaft spacing and sheave widths, and which drive can readily be constructed for effective use with either long or short spacings between the driving and the driven shaft.

More particularly, our invention aims to provide the following novel arrangements and constructions of many portions of such a variable speed drive, for overcoming difficulties encountered with provisions heretofore employed for allied purposes:

(a) A simple pivoted support for the driving motor which carries the expansible sheave or sheaves on its shaft, so that this assemblage can readily be oscillated for varying the shaft spacing, thereby avoiding the higher cost and friction losses encountered with the use of guideways for the motor base.

(b) A construction of the two halves of each expansible sheave for reducing the space required longitudinally of the shaft, and for providing for enforced ventilation of the sheave.

(c) An expansible sheave and shaft assemblage in which the sheave width can be decreased by mere axial pressure on a thrust-receiving member mounted in the outer end of a slidable sheave section, thereby eliminating the need of elements threaded into a part of the said assemblage and of associated sprocket and chain provisions.

(d) The effecting of the sheave-width-varying thrust on the said thrust-receiving member by a simple wedge having such a length and gradual taper as to reduce friction losses.

(e) Simple interengaging provisions on the thrust-receiving member and the wedge whereby they guide each other cooperatively.

(f) Simple means for eliminating the thrust of the wedge against the motor drive shaft; this means involving the use of a double faced wedge.

Illustrative of embodiments of our invention,

Figure 1 is a vertical section, taken along the line 1—1 of Figure 2 through the casing of a motor-driven buffing lathe equipped with a drive including a single-belted embodiment of our inventions;

Figure 2 is a fragmentary vertical section taken along the line 2—2 of Figure 1; this figure illustrates a fundamental disposition of a simple control wedge;

Figure 2a is a detail showing a modified form of contact between the wedge and sheave;

Fig. 2b is a sectional view on the line 2b of Fig. 2.

Figure 8 is a diametric section allied to Figure 2, taken through an expansible sheave for a two-belted drive when the two sheaves are both fully expanded;

Figure 9 is a fragmentary section allied to Figure 8 but taken with the sheaves fully contracted, and also showing both the journaled part of the motor shaft and the stop shoulder on that shaft which prevents the wedge from moving the entire sheave assembly;

Figure 10 is a section taken along the axis of the shaft through an expansible sheave for three belts, in connection with a control arrangement including a two-faced two-pronged wedge and in which the motor shaft indirectly supports the means which press the wedge inwardly of the sheave;

Figure 11 is a view taken from the line 11—11 of Figure 10, showing a portion of the wedge and parts adjacent to it;

Figure 12 is a section taken along the line 12—12 through Figure 11.

Figure 3:
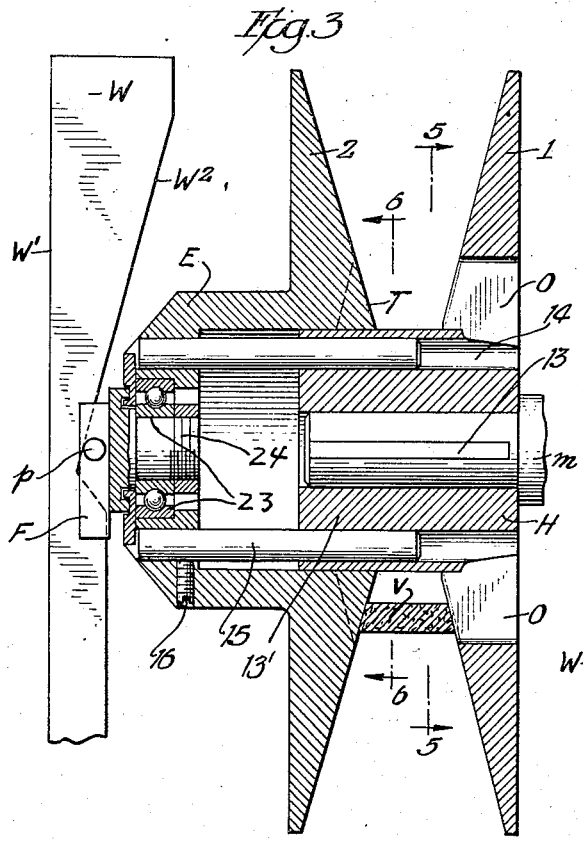
Figure 3 is an enlarged section taken along the axis of the motor-driven expansible sheave of Figure 1, showing the expansion-controlling wedge and the belt in positions corresponding to the advisable maximum expansion of that sheave.

In the polishing lathe partly shown in Figs. 1 and 2, the ends of the casing C support the bearings 10 of a horizontal driven shaft D which has a rigid pulley P secured thereon, which pulley is driven by an endless belt extending also between the sheave halves 1 and 2 of expansible sheave mounted on the parallel shaft $m$ of a motor M. To support this motor for movement toward and away from the driven shaft, the motor is fastened to a supporting plate S pivoted near one side edge to a bracket 3 fastened to the casing on a pivot pin 4 extending parallel to the driven shaft. The motor is thus capable of oscillation on the pivot 4.

Extending downwardly into the casing and threaded through a nut N pivoted at the side edge of the support S, is a control shaft A which extends through a supporting bracket B fastened to the upper exterior of the casing, and carries collars R—R' above and below that bracket for journaling the control shaft. This shaft can conveniently be rotated by a hand wheel W for raising and lowering the motor support to an extent limited by pairs of locknuts L—L' threaded on that shaft respectively above and below the pivoted nut N.

In the expansible sheave, shown in Fig. 3 in an enlarged section looking in the opposite direction from the view of Fig. 2 the stationary sheave section 1 is kept from rotating on the shaft by a key 13, and the shoulder on the shaft prevents that sheave half from sliding toward the motor.

It will be understood that the terms "stationary" and "movable" sections of the sheaves are relative terms, the so-called stationary section being intended as that section which is secured to the drive shaft.

To prevent the movable sheave half 2 from rotating with respect to the companion half we provide the hub 13' of the stationary sheave section with circumferentially spaced longitudinal bores 14 for slidably receiving portions of splining pins 15. Each of these pins also extends into a corresponding bore in the tubular extension E of the hub of the movable sheave section and is fastened in the latter, as by a set screw 16. Then we utilize the cap portion of that extension also for supporting a thrust-receiving element, such as the pin $p$ shown in Figs. 2 and 3, against which pressure can be exerted for moving the slidable sheave section toward the stationary section for changing the effective width of the sheave.

With the thrust-receiving element thus disposed at the axis of the expansible sheave and outwardly beyond other parts of the movable sheave half, we can employ a simple wedge as the means for automatically contracting the width of that sheave in correlation to a movement of the motor shaft toward the driven shaft, and also for properly controlling the sheave-widening thrust of the V-belt when the motor shaft is moved in the opposite direction.

Figure 4:
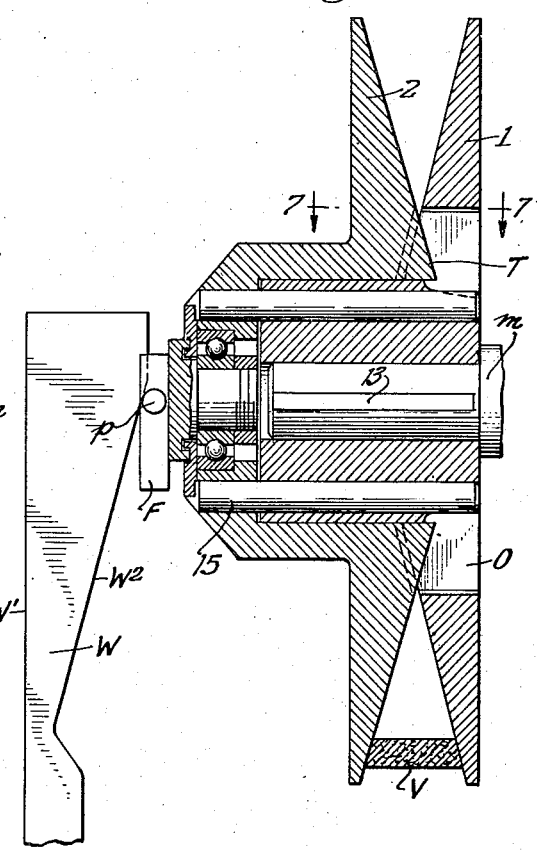
Figure 4 shows the positions of the same elements when the motor has been raised so that the belt has contracted the sheave width approximately to its minimum.

To reduce friction and wear such as would occur in a construction such as shown in Fig. 2a, we preferably mount the needed thrust-receiving member rotatably on the end portion of the slidable sheave section and also construct it for guiding the adjacent part of the wedge. Thus Figs. 3 and 4 show this sheave end as housing a ball race, including an inner race member 23 (shown larger in Fig. 10). Extending through and clamped to this race part is the stem 24 of a stud 30 having two parallel flanges F projecting outwardly from it and equally spaced from the axis of the stud. These flanges are spanned by a cross-pin $p$ (Figs. 3 and 2b) against which the tapering wedge edge W² bears, while the opposite wedge edge W' is disposed in a plane at right angles to the shaft of the sheave.

The suitably spaced flanges F prevent rotation of the stud and the interposed part of the wedge, which has its outer edge W' slidably engaging a presser screw 7 (Fig. 2) extending co-axial with the sheave shaft through a bracket S' fastened to the motor support. Thus arranged, a lowering of the motor and sheave assembly in Fig. 2 will automatically and gradually permit an expanding of the sheave width, and with the opposite movement will contract the sheave.

As shown in Fig. 1, the wedge member W is arranged to lie in a diagonal position with its long axis parallel to a plane intersecting the axes of the driving and driven shafts.

The member W is held at its lower end in a socket 6, a set screw in the socket acting to confine the member in a correct longitudinally adjusted position. Since provision for angular movement of the wedge is essential, due to angular movement of the motor and support, the socket carries a pivot pin 6' which is seated in a bracket 5 mounted on the support C'.

Figure 5:
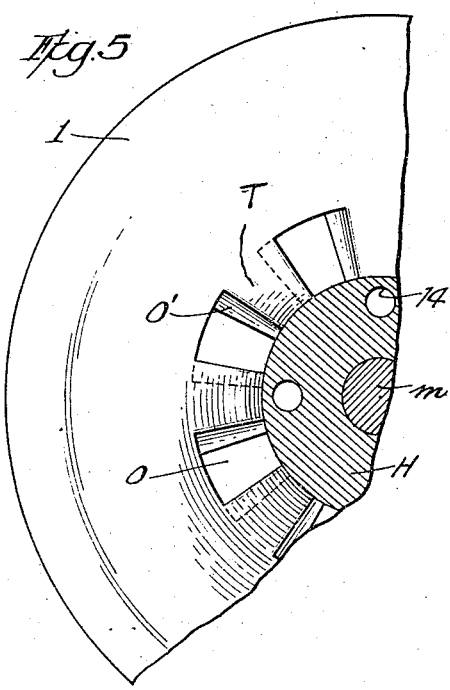
Figure 5 is a fragmentary section taken along the line 5—5 of Figure 3 showing the transverse openings in one sheave section for admitting corresponding teeth on the other sheave half and for causing air to circulate between the hub of the sheave and the belt, and also showing the hub bores for the pins which afford splines to prevent a relative rotation of the two sheave halves.
Figure 6:
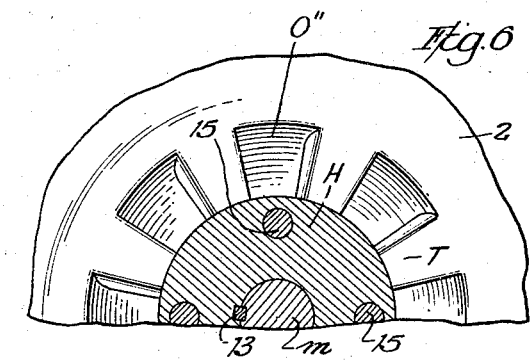
Figure 6 is a fragmentary section taken along the line 6—6 of Figure 3 showing the recesses in the complementary sheave section, these recesses being staggered relative to the openings in the other section.
Figure 7:
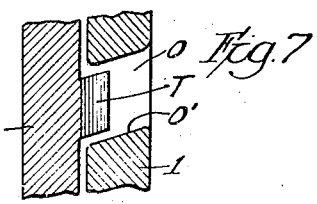
Figure 7 is a fragmentary section taken along the line 7—7 of Figure 4 showing the oblique position of the radial edges of the said perforations which produces an air-moving action during the rotation of the sheave.

As a means for enforcing circulation of air beneath the belt we provide the fixed sheave section with through openings O located immediately adjacent to the hub and spaced around the hub as shown in Fig. 5, the openings being shaped as at O' to have the effect of vanes; that is to say, the openings are formed so that their two sides are at an angle to the longitudinal axis of the sheave. In the complementary sheave section we also provide recesses O'' as shown in Fig. 6, arranged in staggered relation to the openings O, and so spaced that the material T of the sheave sections between the respective openings will enter the openings in the complementary sections when the sections are adjusted to the contracted position shown in Fig. 4. Thus the openings have a double purpose, that of increasing the range of adjustment within a given space and enabling enforced ventilation of the space beneath the belt.

For a two belt drive, a sheave such as shown in Figs. 8 and 9 is provided. In this assembly the hub H' is fixed to the motor drive shaft $m'$ and abuts a shoulder $m^2$ on the shaft. The hub H' carries a tapered flange 1' and the corresponding flange for the second pulley marked 1'' is secured to the hub by means of screws 42. The movable flanges 2' and 2'' are joined through sleeves 18 and the screws 19, the outer section 2'' being integral with the head portion 2a. The axial opening in the head portion slides over the reduced end portion 1—a of the hub and the said axial opening contains the ball race 23 and the thrust member 24. The projecting portion 24h of the thrust member carries the flanges F and the contact pin p. The operation of the wedge with relation to the expansion and contraction of the sheave is the same as that already described. In this construction, as in that shown in Figs. 3 and 4, the flanges of the sheaves are provided with the staggered mating openings which enable the closing up of the sections as shown in Fig. 9.

The construction shown in Fig. 10 provides for triple belts and the details of the sheave itself are the same as described in connection with the twin belt arrangement. However, a novel element is introduced in the means for absorbing the thrust of the wedge action. Under any circumstances the thrust against the motor armature shaft is considerable and in the case of a multiple belt arrangement, it is relatively great. To that end we have provided means such as shown in Fig. 10 for neutralizing the thrust. This consists in the provision of the ball race 22 secured to the inner end of a non-rotatable stud 36, the outer end portion of which stud is flattened and carries a pin 32. The pins 31 are provided in the flange F as already described and the double-faced wedge having the bifurcated end portion is projected between the pins 32—31. Thus all of the expansive force of the wedge is taken up by the bearing 22 which is held in place by the screw 21 that serves to secure the holding sleeve in position. We may prefer to utilize this feature in connection with the single or double belt sheave, since it avoids the necessity for an abutment element such as the bracket S' and screw 7 of Fig. 2.

The taper of the wedge in whatever form it is employed must be correlated to the dimensions of the other elements of the drive and this may be accomplished very cheaply. Thus the mechanism herein disclosed eliminates the numerous elements that have heretofore been employed, such as gears, chains, ratchets, etc. In our construction the only manually movable element required for adjustment is the holding screw by means of which the motor is caused to move toward and away from the fixed driven shaft.

We claim:

1. In an expansible pulley, the combination of axially stationary and slidable complementary sections, a nonrotatable axial stud, having a rotatable connection within and to the stationary section, said stud carrying an exterior abutment, an axial abutment carried by the slidable section and spaced adjacent to and inwardly of the exterior abutment, and a two-faced wedge acting between said abutments for moving the slidable section toward the stationary section.

2. In a change speed device, the combination of a support, a platform mounted for oscillation on said support and screw means applied to the free edge of the platform for oscillating the same, a driven shaft and a rigid pulley fixed on said shaft against movement in any direction on said shaft, a driving element mounted on said platform, said element having a driving shaft, one section of an expansive sheave being fixed on said shaft against movement in any direction, the bodily movement of the fixed section of the expansible sheave being in an unchangeable plane relative to the driven pulley, a sheave section mounted for axial movement relative to the fixed sheave section, an antifriction thrust bearing at the outer end of the movable sheave section, a wedge member mounted for oscillation on the support and constructed to engage and prevent rotation of one part of said antifriction bearing, and a thrust abutment carried by the platform and engaging the outside of the wedge at substantially the axis of rotation of the driving shaft, the wedge being arranged to be effective at substantially right angles to the path of oscillation of the driving shaft.

3. In a change speed device, the combination of a support, a platform mounted for oscillation on said support and screw means applied to the free edge of the platform for oscillating same, a driven shaft and a pulley on said shaft, a driving element mounted on said platform, said element having a driving shaft, one section of an expansive sheave being fixed on said shaft against movement in any direction, said fixed section having a hub and said driving shaft terminating within the limits of the hub, a sheave section mounted for axial movement relative to the fixed sheave section, an antifriction thrust bearing at the outer end of the movable sheave section, a wedge member mounted for oscillation on the support and constructed to engage said antifriction bearing at its axis of rotation, and a thrust abutment carried by the platform and engaging the outside of the wedge at substantially the axis of rotation of the driven shaft, the wedge being arranged to be effective at substantially right angles to the path of oscillation of the driving shaft.

4. In a change speed device, the combination of a support, a platform mounted for oscillation on said support and screw means applied to the free edge of the platform for oscillating same, a driven shaft and a pulley on said shaft, a driving element mounted on said platform, said element having a driving shaft, one section of an expansive sheave being fixed on said shaft against movement in any direction, said fixed section having a hub and said driving shaft terminating within the limits of the hub, a sheave section mounted for axial movement relative to the fixed sheave section, said movable sheave section having a plurality of angularly spaced splining pins connecting the two sections, an antifriction thrust bearing at the outer end of the movable sheave section, a wedge member mounted for oscillation on the support and constructed to engage said antifriction bearing at its axis of rotation, and a thrust abutment carried by the platform and engaging the outside of the wedge at substantially the axis of rotation of the driven shaft, the wedge being arranged to be effective at substantially right angles to the path of oscillation of the driving shaft.

5. In a change speed device, the combination of a support, a platform mounted for oscillation on said support and screw means applied to the free edge of the platform for oscillating the same, a driven shaft and a pulley on said shaft, a driving element mounted on said platform, said element having a driven shaft, one section of an expansive sheave being fixed on said shaft against movement in any direction, a sheave section mounted for axial movement relative to the first sheave section, an antifriction thrust bearing at the outer end of the movable sheave section, a wedge member mounted for oscillation on the support and constructed to engage and prevent rotation of one part of said antifriction bearing, means for varying the longitudinal position of the wedge relative to its point of engagement with the bearing, and a thrust abutment carried by the platform and engaging the outside of the wedge at substantially the axis of rotation of the driving shaft, the wedge being arranged to be effective at substantially right angles to the path of oscillation of the driving shaft.

6. In a change speed device, the combination of a support, a platform mounted for oscillation on said support and screw means applied to the free edge of the platform for oscillating the same, a driven shaft and a pulley on said shaft, a driving element mounted on said platform, said element having a driving shaft, one section of an expansive sheave being fixed on said shaft against movement in any direction, a sheave section mounted for axial movement relative to the fixed sheave section, an antifriction thrust bearing at the outer end of the movable sheave section, a wedge member mounted for oscillation on the support and constructed to engage and prevent rotation of one part of said antifriction bearing, a thrust abutment carried by the platform and engaging the outside of the wedge at substantially the axis of rotation of the driving shaft, and means for adjusting the effective position of the abutment, the wedge being arranged at substantially right angles to the path of oscillation of the driving shaft.

7. In a change speed device, the combination of a support, a platform mounted on the support and adapted for oscillation, means for oscillating the platform, a driven shaft, a rigid pulley fixed on said rigid shaft against movement in any direction thereon, a driving element mounted on the platform and including a driving shaft, one section of an expansible sheave fixed on said driving shaft against movement in any direction, a sheave section mounted on said driving shaft for axial movement relative to the fixed sheave section, a thrust bearing at the outer end of the movable sheave section, spaced parallel flanges carried by and projecting outwardly from the thrust bearing, a pin carried by and between the flanges, and a wedge member mounted for oscillation on the support and adapted to be received between and guided by the flanges with one edge in contact with the pin carried by the flanges.

8. In a change speed device, the combination of a support, a platform mounted on the support and adapted for oscillation, means for oscillating the platform, a driven shaft, a rigid pulley fixed on said rigid shaft against movement in any direction thereon, a driving element mounted on the platform and including a driving shaft, one section of an expansible sheave fixed on said driving shaft against movement in any direction, a sheave section mounted on said driving shaft for axial movement relative to the fixed sheave section, a thrust bearing at the outer end of the movable sheave section, spaced parallel flanges carried by and projecting outwardly from the thrust bearing, a pin carried by and between the flanges, a wedge member mounted for oscillation on the support and adapted to be received between and guided by the flanges with one edge in contact with the pin carried by the flanges, and a thrust abutment carried by the platform and engageable with the opposite edge of the wedge at substantially the axis of rotation of the driving shaft.

9. In a change speed device, the combination of a support, a platform mounted on the support and adapted for oscillation, means for oscillating the platform, a driven shaft, a rigid pulley fixed on said rigid shaft against movement in any direction thereon, a driving element mounted on the platform and including a driving shaft, one section of an expansible sheave fixed on said driving shaft against movement in any direction, a sheave section mounted on said driving shaft for axial movement relative to the fixed sheave section, a thrust bearing at the outer end of the movable sheave section, spaced parallel flanges carried by and projecting outwardly from the thrust bearing, a pin carried by and between the flanges, a wedge member mounted for oscillation on the support and adapted to be received between and guided by the flanges with one edge in contact with the pin carried by the flanges, and an adjustable thrust abutment carried by the platform and engageable with the opposite edge of the wedge at substantially the axis of rotation of the driving shaft.

10. In an expansible pulley, the combination of axially stationary and slidable complementary sections, a non-rotatable axial stud rotatably connected within and to the stationary section, an exterior abutment carried by the stud, an axial abutment carried by the slidable section and spaced adjacent to and inwardly of the exterior abutment, spaced parallel flanges on the axial abutment, and a two face wedge acting between said abutments and operable between the flanges for moving the slidable section towards the stationary section.

11. In an expansible pulley, the combination of axially stationary and slidable complementary sections, a non-rotatable axial stud rotatably connected within and to the stationary section, outwardly directed lateral projections carried by the stud, a member carried by the slidable section and rotatable relative thereto, spaced parallel flanges on the member carried by the slidable section, inwardly directed lateral projections carried by the flanges, and a two face wedge operable between the flanges and acting between the projections carried by the stud and the projections carried by the flanges for moving the slidable section towards the stationary section.

ARTHUR W. L'HOMMEDIEU.
ERIC HAWKINSON.